United States Patent [19]

Male

[11] Patent Number: 4,517,622
[45] Date of Patent: May 14, 1985

[54] CAPACITIVE PRESSURE TRANSDUCER SIGNAL CONDITIONING CIRCUIT

[75] Inventor: Barry Male, Windsor Locks, Conn.

[73] Assignee: United Technologies Corporation, Hartford, Conn.

[21] Appl. No.: 527,530

[22] Filed: Aug. 29, 1983

[51] Int. Cl.³ .................. H01G 7/00; H01G 9/16; G01L 9/12
[52] U.S. Cl. ........................... 361/283; 73/718; 361/434
[58] Field of Search ........... 361/283, 434; 73/718

[56] References Cited

U.S. PATENT DOCUMENTS

| | | | |
|---|---|---|---|
| 3,634,727 | 1/1972 | Polye | 361/434 |
| 3,858,097 | 12/1974 | Polye | 361/283 |
| 4,262,540 | 4/1981 | Tamai et al. | 361/283 X |
| 4,386,312 | 5/1983 | Briefer | 73/718 X |

Primary Examiner—Donald A. Griffin
Attorney, Agent, or Firm—Dominic J. Chiantera

[57] ABSTRACT

Signal conditioning circuitry for a three plate capacitive pressure transducer eliminates the effects of parasitic capacitance in the transducer's output, to provide a true indication of sensed pressure magnitude as an electrical signal equivalent of the instantaneous value of only the pressure responsive capacitance of the transducer.

6 Claims, 5 Drawing Figures ic pressure transducer signal conditioning apparatus of the present invention;

CAPACITIVE PRESSURE TRANSDUCER SIGNAL CONDITIONING CIRCUIT

DESCRIPTION

Technical Field

This invention relates to signal conditioning circuitry, and more particularly to signal conditioning circuitry for silicon capacitive pressure transducers.

Background Art

Silicon capacitive pressure transducers are well known in the art. U.S. Pat. No. 3,634,727 to Polye discloses one type in which a pair of centrally aperatured, conductive silicon plates are joined together with a eutectic metal bond, such that the silicon disc plates flex with applied pressure, changing the capacitance of the aperature interstice and providing a capacitive-type signal manifestation of pressure magnitude.

The limitation on the sensed accuracy of the capacitive pressure transducer is parasitic capacitance, i.e. the inherent capacitance of the nonpressure sensitive interstices of the transducer structure. Parasitic capacitance reduces the gain of the pressure dependent capacitive, such that great emphasis is placed on the transducer architecture so as to minimize it. However, parasitic capacitance is pervasive to any physical structure and there is a minimum practically achievable value which may still be unacceptable in high sensitivity applications.

In a copending application of the same assignee entitled: THREE PLATE, SILICON-GLASS-SILICON CAPACITIVE PRESSURE TRANSDUCER, U.S. Ser. No. 527,531 filed on Aug. 29, 1983 by D. H. Grantham and J. L. Swindal, a three-plate capacative pressure transducer structure is disclosed which includes a central electrode disposed in the transducer's dielectric body, intermediate to a pair of conductive silicon plates. The central electrode bounds one end of a vacuum chamber formed in the dielectric, opposite the one of the silicon plates functioning as the transducer diaphragm, which bounds the opposite end of the chamber. The vacuum chamber provides the pressure sensitive interstice. The silicon diaphragm flexes in response to applied pressure and modulates the capacitance of the chamber between the diaphragm and the central electrode. The dielectric material between the central electrode and the other silicon plate or substrate, and that dielectric between the diaphragm and the substrate which is not masked by the dielectrode, provide the structure's principal parasitic capacitance.

In the Grantham et al transducer the manifestation of sensed pressure is the capacitance between the electrode and silicon diaphragm. Since both silicon plates are conductive, the parasitic capacitance between the electrode and the silicon substrate is in electrical series with the parasitic capacitance between the substrate and the diaphragm when measured with respect to the output of the transducer, i.e. the electrode to diaphragm junction. This reduces the total parasitic capacitance value to less than the smaller of the two principal values. This total parasitic capacitance is in parallel with and summed to, the pressure sensitive capacitance to provide the transducer's output capacitance ($C_0$) value. Although minimized, the parasitic capacitance still accounts for a substantial amount of the transducer's total capacitive output, so as to detract from the transducer sensitivity, proportionately, by the ratio of its magnitude to the total output capacitance value.

DISCLOSURE OF INVENTION

The object of the present invention is to provide signal conditioning apparatus for a three plate silicon capacitive pressure transducer which eliminates the effects of parasitic capacitance in providing the electrical signal equivalent of the transducer's sensed pressure manifestation.

According to the present invention, the signal conditioning apparatus provides equal phase bistable current signals to the electrode-to-diaphragm and to the substrate-to-diaphragm junctions of the transducer and alternates the instantaneous state value of the bistable current signals between high and low amplitude values in response to the increasing and decreasing amplitude, respectively, of the voltage signal resulting from integration of the bistable current signal by the transducer's pressure sensitive capacitance at a rate dependent on the instantaneous pressure sensitive capacitance value, the parasitic capacitance being nonresponsive due to equal current signals at the transducer electrode and substrate, the apparatus providing said alternating bistable current signal frequency as determined by the instantaneous value of the pressure sensitive capacitance as the electrical signal equivalent of the transducer's sensed pressure manifestation absent any parasitic capacitance effect.

The signal conditioning circuitry of the present invention, when used in combination with the three-plate silicon capacitive pressure transducer, eliminates the effect of the parasitic capacitance of the transducer structure by equalizing the voltage potential between the central electrode and the nonpressure sensing, silicon plate, thereby providing electrical equivalence of the two and reduction of the interstice capacitance to zero. As such, the transducer capacitive output manifestation is unaffected by the attenuating effects of the parasitic capacitance, and the corresponding electrical signal equivalent has a much higher pressure sensed accuracy due to the enhanced signal-to-noise ration.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 4:
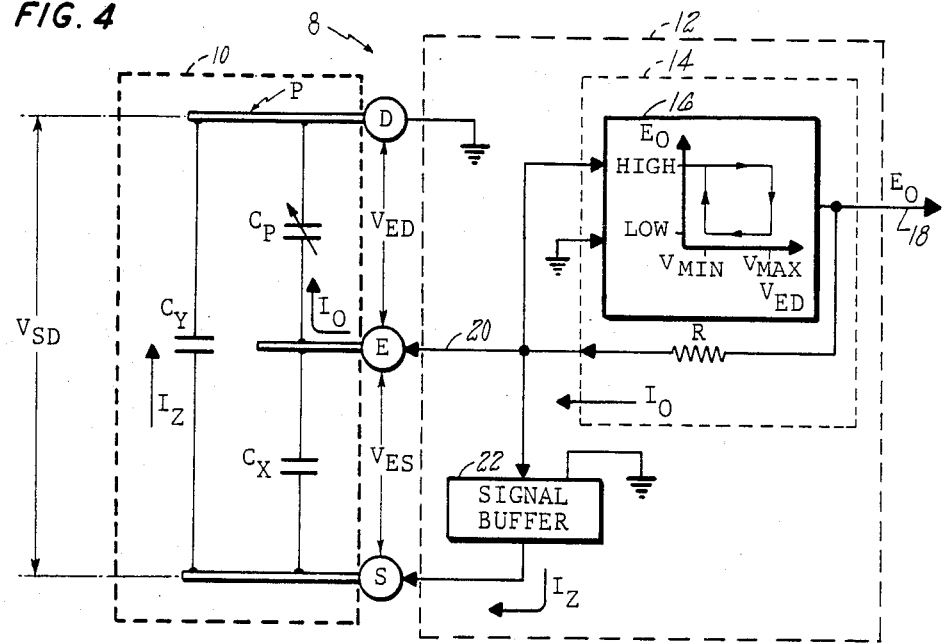
FIG. 4 is a functional diagram of the present pressure transducer signal conditioning circuitry.

Referring first to FIG. 4, in a simplified schematic illustration of the present invention, a pressure sensor 8 includes a three plate, silicon-glass-silicon (SGS) capacitive pressure transducer 10 for providing a manifestation of sensed pressure (P) to signal conditioning apparatus 12 which provides an electrical signal equivalent. The manifestation is the ratio of the change in the transducer's pressure sensitive capacitance ($C_p$), in the interstice between the conductive silicon diaphragm (D) and central electrode (D), relative to the sum nonpressure sensitive parasitic capacitance of Cx, between the central electrode and silicon substrate (S), and Cy, between those commonly registered surface areas of the substrate and diaphragm not masked by the central electrode.

In FIG. 4 only the transducer's major parasitic capacitances are shown. The silicon diaphragm and substrate are each conductive, such that the sum parasitic capacitance $C' = Cx \cdot Cy/Cx + Cy$ is in parallel with the pressure sensitive capacitance Cp to provide an output capacitance value $Co = C_p + C'$ between the electrode (E) and diaphragm (D).

The signal conditioning apparatus includes conversion circuitry 14 for providing a current signal ($I_o$) to the pressure sensitive capacitance $C_p$ and a current ($I_Z$) to the parasitic capacitances Cx, Cy via the substrate (S). The $I_o$ current signal is provided by a bistable voltage signal ($E_o$) from source 16 on line 18, and current limiting resistor R, and is presented directly to the electrode to diaphragm junction. The $C_p$ capacitance integrates the $I_o$ current signal at a rate equal to the time constant $R \cdot C_p$ to provide the actual voltage integral signal VED across the electrode to diaphragm output. An equal phase and magnitude voltage integral signal (i.e. equivalent) is presented to the substrate to diaphragm junction through signal buffer 22, which maintains electrical isolation of the substrate from the electrode.

Figure 5:
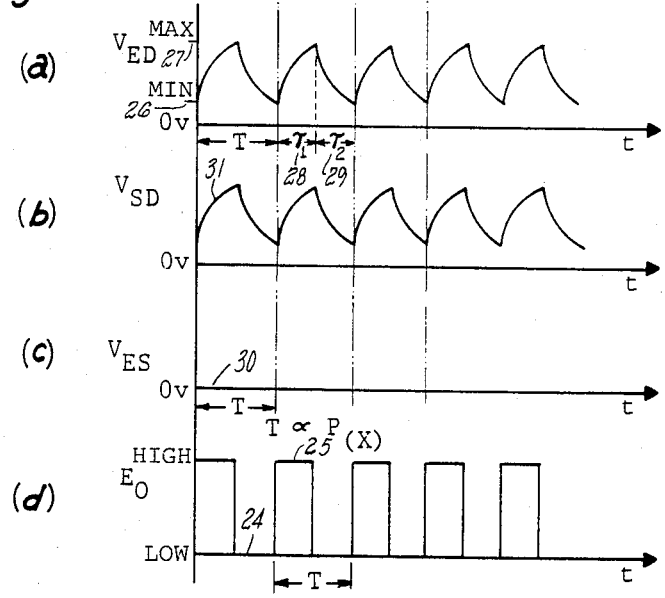
FIG. 5 is an illustration of signal waveforms used in the description of FIG. 4.

The $V_{ED}$ signal (FIG. 5, illustration (a) is fed back to the signal input of the bistable source to control the amplitude state value of the Eo output signal (FIG. 5, illustration (d)). The bistable source is a known type, such as a Schmitt trigger, which provides the bistable output signal in alternate V HIGH and V LOW level states in dependence on the $V_{ED}$ signal amplitude being less than a min threshold value ($V_{MIN}$) or greater than a max threshold value ($V_{MAX}$).

In operation, the transition of the bistable output amplitude from a V LOW state 24 to a V HIGH state 25 (FIG. 5, illustration (d)) establishes a maximum Io current through resistor R and variable capacitor Cp. The capacitor responds by integrating the current rate $R \cdot Cp$ to provide the $V_{ED}$ output, which over a time interval $\tau 1$, (28, FIG. 5, illustration (a)) may be described as $V_{ED} = V_{HIGH} - [V_{HIGH} - V_{MIN}] \cdot e^{-t/R \cdot Cp}$; where $V_{MIN}$ 26 is the bistable source low threshold value. $V_{ED}$ integrates to the bistable source high threshold value ($V_{MAX}$) 27 over the interval $\tau 1 = R \cdot Cp \cdot \ln[V_{HIGH} - V_{MIN}/V_{HIGH} - V_{MAX}]$. At $V_{MAX}$ the bistable output transitions to the low state and Cp integrates oppositely; providing the output $V_{ED} = -V_{MAX} \cdot e^{-t/RC_p}$ over the time interval $\tau 2 = R \cdot Cp \cdot \ln[V_{MAX}/V_{MIN}]$ (29, FIG. 5, illustration (a)). The sum $\tau_1 + \tau_2 = T$; the pulse repetition period of the bistable output signal. The bistable signal frequency $(F = 1/T)$ provides the signal equivalent output of sensed pressure; since T is directly proportional to sensed pressure magnitude (i.e. inversely proportional to Cp). As the sensed pressure magnitude increases, diaphragm flexure increases, the capacitance Cp increases and the frequency (F) of Eo decreases.

Since equal phase and magnitude voltage signals are presented to the electrode-to-diaphragm and substrate-to-diaphragm junction the current through the electrode to substrate parasitic capacitance (Cx) is zero. All of the $I_o$ current flows through the pressure sensitive capacitance Cp. The electrode to substrate voltage potential ($V_{ES}$) is zero (30, FIG. 5, illustration (C)) and the effect of parasitic capacitance Cx on the $V_{ED}$ signal is eliminated. In effect Cx=0 and $C'=(0) \cdot CY/0 + Cy = 0$ such that $C_o = Cp$. As such, Co changes directly with Cp; i.e. $\Delta C_o = \Delta Cp$. The substrate to diaphragm voltage ($V_{SD}$) is equal to $V_{ED}$ (waveform 31, FIG. 5, illustration (b)), and the $I_Z$ current (buffered from the $I_o$ output) flows through the substrate to diaphragm capacitance CY.

With zero $I_o$ current through the parasitic capacitance Cx, all of the $I_o$ current flow is through the pressure sensitive capacitance $C_p$ (the input impedances of buffer 22 and converter 14 are essentially infinite). Any change in capacitance $\Delta C_p$ is detected as a change in $I_o$ directly, without attenuation due to current sharing with the parasitic capacitances. As such the $\Delta C_p$ is sensed immediately as a change in the rate of integration and, therefore, as a change in frequency. The FIG. 4 pressure sensor comprises a single transducer and associated signal conditioning apparatus. It measures pressure absolutely. The elimination of the effects of the parasitic capacitance emphasizes the less significant errors associated with the transducer and signal conditioning circuitry. For example, transducer errors associated with temperature, aging, etc. together with temperature and tolerance errors of the electronic signal conditioning, all result in offsets which affect the sensed pressure accuracy. These offset errors may be eliminated by performing comparative pressure measurements of the unknown pressure signal. That is, the use of a reference pressure which is sensed and processed in an identical manner as the unknown pressure, through common signal conditioning circuitry, so as to eliminate the offset errors common to both sensed signals.

Figure 1:
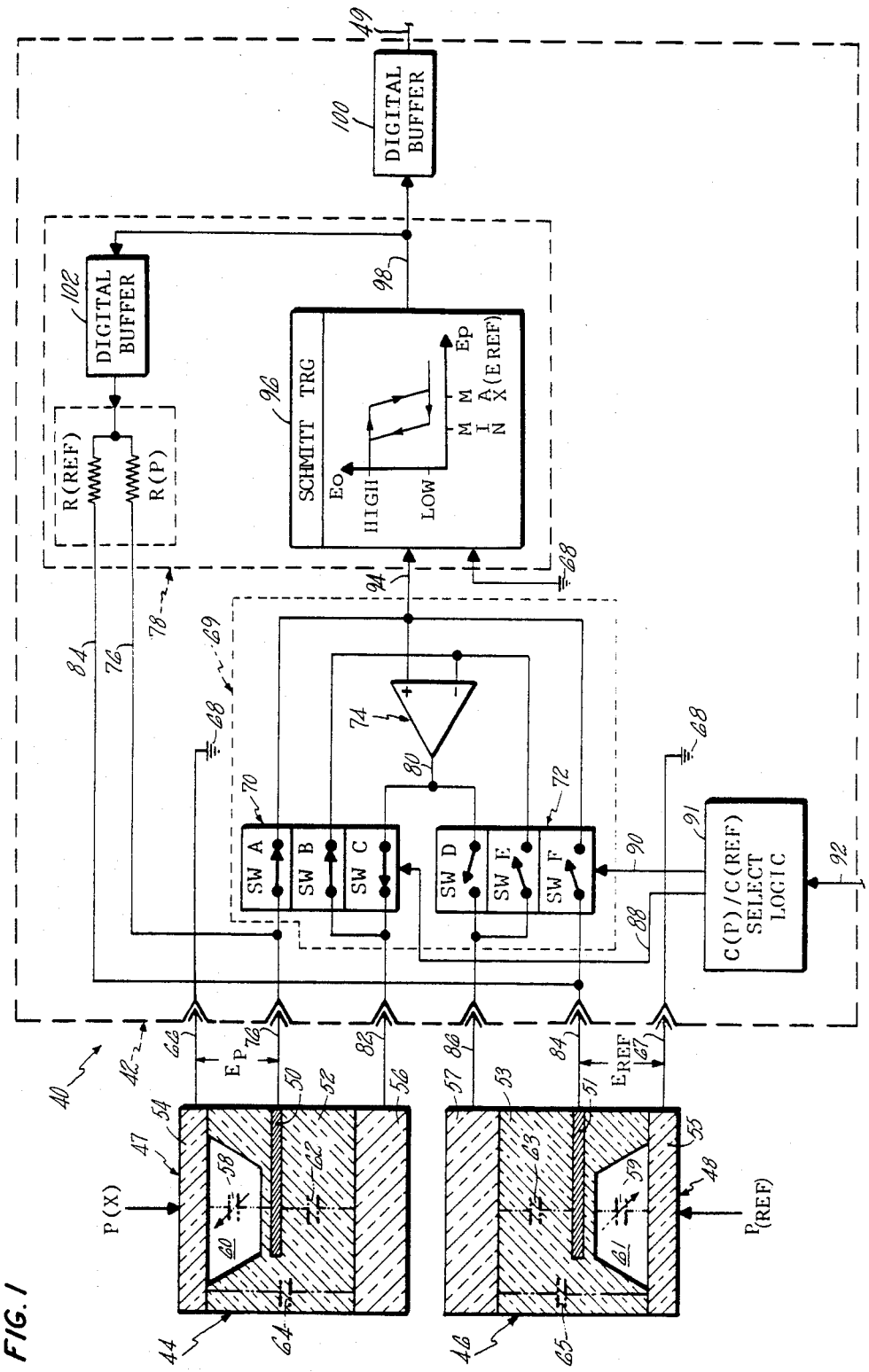
FIG. 1 is a schematic diagram of a best mode embodiment of the pressure transducer signal conditioning apparatus of the present invention.

Referring now to FIG. 1, in a best mode embodiment of a pressure sensor 40, signal conditioning apparatus 42 converts the instantaneous pressure sensitive capacitance values of each of a pair of silicon capacitive pressure transducers 44, 46. Each are three plate SGS transducers of the type disclosed in the hereinbefore referenced copending application to Grantham et al, and illustrated schematically in FIG. 4. The transducers are illustrated in simplifed cross section in FIG. 1; not to scale. Transducer 44 senses the unknown pressure signal P(X) applied to pressure sensing surface 47, and transducer 46 senses the reference pressure signal P(REF) on surface 48. The signal conditioning circuitry provides an electrical signal equivalent for each on output line 49; each at a frequency corresponding to the sensed pressure from the associated transducer. The signals are individually sampled, periodically, by the user system (the system using the sensed pressure signals) microprocessor, as described with respect to FIG. 2

The transducers each have three elements: (i) the central electrodes 50, 51 disposed within the transducer glass dielectric structures 52, 53, (ii) the conductive silicon diaphragms 54, 55, and (iii) a nonpressure sensitive inductive silicon substrate 56, 57. All three elements are electrically conductive. The silicon diaphragm and substrate have specified N doping levels so as to allow direct electrical connection to each.

The principal transducer capacitances are shown in phantom. These are the pressure sensitive capacitances 58, 59 of the interstice formed by chambers 60, 61. The applied pressure on diaphragm surfaces 47, 48 result in diaphragm flexure which modulates the diaphragm to central electrode spacing, changing the instantaneous value of the capacitance. The principal parasitic capacitances, as discussed hereinbefore with respect to FIG. 4, include the electrode to substrate capacitances 62, 63 (referred to in FIG. 4 as $C_X$) and the diaphragm to substrate capacitances 64, 65 ($C_Y$ in FIG. 4) that exist between those portions of the diaphragm and substrate in register and not masked by the central electrode.

The signal conditioning apparatus is connected to all three plates of each transducer. As in the simplified embodiment of FIG. 4 the transducer diaphragms are electrically grounded. Although this is preferred due to the fact that the diaphragms are common current return paths for the signals applied to the electrode and substrate, the ground connections are discretionary; direct wire connections may be used. The diaphragms are shown connected through lines 66, 67 to the signal conditioning apparatus signal ground 68.

The central electrode and substrate of each transducer are provided with equal phase and magnitude voltage signals as in the embodiment of FIG. 4. In the FIG. 1 embodiment, however, the substrate current buffer 69 is common to each transducer and must be switched back and forth providing connections to each transducer in each transducer's sample time interval. This is accomplished through the voltage controlled switch sets 70, 72 which connect the input/output signals from the voltage follower operational amplifier 74 to provide the voltage signals to each substrate and central electrode. The switch sets each include three single pole single throw switches; the switch set 70 having switches SW A-C and set 72 having SW D-F.

The transducer 44 central electrode 50 receives the Io current signal on a line 76 from conversion circuitry 78. The resulting voltage integral signal is coupled through SW A to the noninverting (+) input of follower 74 to provide the equal phase and magnitude voltage signal on line 80 through closed SW C contact and line 82 to the substrate 56. The closed SW B contact provides closed loop feedback from the substrate to the follower's inverting input for closed loop operation. Similarly, transducer 46 electrode receives the $I_O$ current signal on line 84 from conversion circuitry 78. With switch 72 energized and 70 de-energized, the current signal is presented through SW F to the follower noninverting input to provide the $I_Z$ current through SW D and line 86 to substrate 57; SW E contact provides the feedback signal to the amplifier.

Only one switch set is closed at any time. Each set alternates opening and closing in response to switching signals provided on lines 88, 90 from C(P)/C(REF) select logic circuitry 91. The switching signals are provided by the logic circuitry in response to sequence control signals provided on line 92 from the parent, or user system signal processor, i.e. that system which is sampling the sensed pressure output signals.

As in FIG. 4 each transducer's pressure sensitive capacitance integrates the $I_O$ current signal in each transducer's sample time interval to provide the $V_{ED}$ voltage signal. In the embodiment of FIG. 1 the $V_{ED}$ voltage signal is labeled Ep for the transducer 44 unknown pressure sensed signal P(X) and $E_{REF}$ for the transducer 46 reference P(REF). With closure of the associated switch set contact the sample interval voltage signal is presented to the input 94 of the conversion circuitry, which includes the bistable current source e.g. Schmitt trigger 96. The bistable source provides the bistable $E_O$ voltage signal on line 98 to digital buffers 100, 102. The buffer 100 presents to $E_O$ signal to the apparatus output line 49; the buffer 102 provides the Schmitt trigger output to each transducer central electrode through associated precision resistors R(P) for the unknown sensed pressure transducer R(REF) for the reference pressure transducer. The current limiting resistors are analogous to the resistor R of FIG. 4. They are equal value, known type precision film resistors, such as tantalum nitrite (TaNi) or nicrome (NiCr). The resistors and related transducer pressure sensitive capacitance determine the frequency of the output $E_O$ voltage signal on lines 98, 49.

The pressure sensor system of FIG. 1 is operated in a host system; either a control system in which electrodes, through associated precision resistors R(P) for the unknown sensed pressure transducer and R(REF) for the reference pressure transducer. The current limiting resistors are analogous to the resistor R of FIG. 4. They are equal value, known type precision film resistors, such as tantalum nitrite (TaNi) or nicrome (NiCr). The resistors and related transducer pressure sensitive capacitance determine the frequency of the output $E_O$ voltage signal on lines 98, 49.

Figure 2:
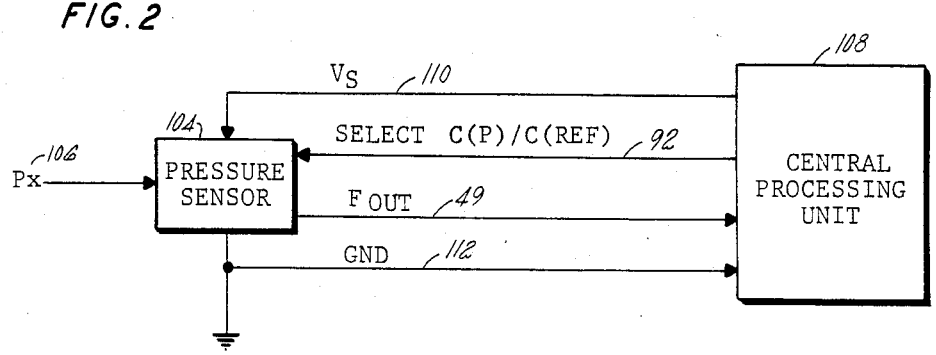
FIG. 2 is a simplified diagram illustrating system operation of the pressure transducer signal cgnditioning apparatus of FIG. 1 under central processing unit (CPU) control.

The pressure sensor system of FIG. 1 is operated in a host system; either a control system in which sensed pressure is one of the controlled device responsive parameters, or a data acquisition system. The operation of bistable 96 is identical to that described with respect of FIG. 4; $V_{MAX}$ and $V_{MAN}$ input thresholds determine the LOW/HIGH state values for the $E_O$ output signal. The Schmitt trigger responds to each input voltage interval, $E_P$ and E(REF) in each respective sampling interval. The sensor receives control and excitation signals from the host, or user system, i.e. central processing unit (CPU), as shown in FIG. 2. The sensor 104 senses the magnitude of an applied pressure signal 106 and provides the equivalent $E_O$ electrical signal at a frequency $F_{OUT}$ indicative of pressure on output line 49 to the host system CPU 108. The sensor receives from the host CPU the source of the switch control signals for the switch sets 70, 72 (FIG. 1) on line 92 and voltage source excitation signals $V_S$ on a line 110. The sensor and CPU have common signal grounds through line 112.

Figure 3:
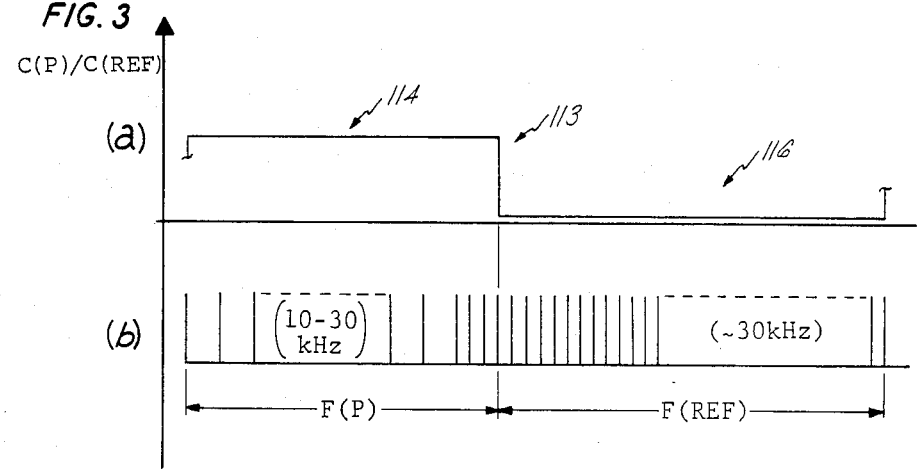
FIG. 3 is an illustration of signal waveforms used in the description of the FIG. 1 embodiment.

In the operation of the FIG. 1 pressure sensing system the unknown pressure P(X) and reference pressure P(REF) are alternately sensed in response to the control $C_{(P)}/C_{(REF)}$ signals on line 92. In FIG. 3 the line 92 control signal from the host system CPU, e.g. C(P)/C(REF), is shown by waveform 113 (illustration (a)) as including a $C_{(P)}$ cycle 114 followed by a $C_{(REF)}$ cycle 116. In the C(P) cycle the closed state for switch set 70 results in an $E_O$ signal frequency corresponding to the sensed pressure P(X). A typical range of sensed pressure frequencies from a maximum sensed pressure to a minimum sensed pressure is on the order of 10 to 30 KHz. The output signal frequency F(P) corresponding to the sensed unknown P(X) is sampled and stored by the host CPU. In the succeeding cycle 116 the line 92 signal goes low (logic zero) to select the $C_{REF}$ state, opening all the switches of set 70 and closing those in set 72 to connect the voltage follower operational amplifier 74 to the P(REF) transducer. The reference pressure is constant; typically equal to the minimum value of the unknown pressure range. The host CPU then performs a ratiometric calculation of the F(P) value divided by the F(REF) value to provide a sensed pressure indication from the successive, alternate transducer sample time intervals.

Although the invention has been shown and described with respect to best mode embodiments thereof, it should be understood to those skilled in the art that the foregoing and various other changes and omissions in the form and detail thereof may be made therein without departing from the spirit and the scope of the invention.

Having thus described a best mode of my invention that which I claim as new and desire to secure by Letters Patent is:

1. Apparatus, responsive to a capacitive pressure transducer's indication of pressure magnitude as the instantaneous value of a pressure responsive capacitance associated with the central electrode-to-diaphragm junction of the transducer in combination with the value of the nonpressure responsive capacitance associated with the central electrode-to-substrate junction of the transducer, for providing a signal indication of the instantaneous value of the pressure responsive capacitance, comprising:

conversion means, connected at an input and output thereof for regenerative response to the transducer's central electrode-to-diaphragm junction, for providing thereto an output bistable current signal having alternate high current and low current states in dependence on the alternately increasing and decreasing amplitude of an actual voltage integral signal provided by the pressure responsive capacitance in response to said bistable current signal, said integral signal having an amplitude rate of change dependent on the instantaneous value of said pressure responsive capacitance, said conversion means providing as said signal indication of the instantaneous value of the pressure responsive capacitance the frequency at which said bistable signal alternates between said high and low signal states; and signal coupling means, responsive to said conversion means bistable current signal for providing an equivalent voltage integral signal to the transducer's substrate-to-diaphragm junction, whereby said central electrode-to-substrate junction nonpressure responsive capacitance is presented with a zero voltage potential thereacross to provide a zero integral response.

2. The apparatus of claim 1, wherein said conversion means comprises:

bistable means, having an input with maximum amplitude and minimun amplitude threshold limits responsive to said integral signal, for providing an oscillating bistable voltage signal with alternate high voltage and low voltage signal states and oscillating therebetween at a frequency corresponding to said amplitude rate of change of said integral signal amplitude between said amplitude threshold limits, whereby said oscillating bistable signal frequency provides the apparatus indication of the instantaneous value of the pressure responsive capacitance; and current source means responsive to said oscillating bistable voltage signal for providing said output bistable current signal with the high current and low current signal states thereof in correspondence with the high voltage and low voltage signal states of said bistable voltage signal.

3. The apparatus of claim 1, wherein said equivalent voltage integral signal provided by said signal coupling means is equal in phase and magnitude to said actual voltage integral signal provided by said conversion means.

4. The apparatus of claim 1, wherein said equivalent voltage integral signal provided to the substrate to diaphragm junction is electrically isolated from said actual voltage integral signal appearing at the central electrode-to-diaphragm junction.

5. The method of providing a signal indication of the instantaneous value of the pressure responsive capacitance of a three element capacitive pressure transducer which provides an output capacitive indication of sensed pressure magnitude in the form of the combined values of the pressure responsive capacitance associated with the central electrode to diaphragm junction of the transducer and the nonpressure responsive capacitance associated with the central electrode to substrate junction of the transducer, comprising the steps of:

providing, in regenerative fashion a bistable current signal having alternate high current and low current states to the transducer's central electrode to diaphragm junction, and alternating the signal between states in dependence on the amplitude of the actual integral signal provided by the pressure responsive capacitance in response thereto, applying an equal phase and magnitude voltage integral signal to the substrate to diaphragm junction of the transducer.

6. A pressure sensor for providing output signal indicia of the magnitude of an applied pressure signal, comprising:

a source of reference pressure signals;

a pair of three plate capacitive pressure transducers for providing an output capacitance indication of sensed pressure magnitude in the form of the combined values of the pressure responsive capacitance associated with the central electrode to the pressure sensitive diaphragm junction of the transducer and the nonpressure responsive capacitance associated with the central electrode to substrate junction thereof, a first one of said transducers being responsive to said source of reference pressure signals and the other one of said transducers being responsive to the applied pressure signal; and signal conditioning means for converting the capacitive indication of sensed pressure magnitude from each transducer into an electrical signal respresentative of the instantaneous value of the pressure responsive capacitance of each, in each of a successive number of sampling periods associated with each transducer, said signal conditioning apparatus connected at an input and output thereof for regenerative response to each transducer's central electrode to diaphragm junction in a related sampling period to provide thereto a source bistable current signal having alternate high current and low current states in dependence on the alternately increasing and decreasing amplitude of a voltage integral signal provided to said input by each transducer's pressure responsive capacitance in response thereto, each of said integral signals having an amplitude rate of change dependent on the instantaneous value of the associated transducer pressure responsive capacitance, said signal conditioning apparatus providing said signal representation of the instantaneous value of each transducer's pressure responsive capacitance as the frequency at which said bistable signal alternates between said high and low current states, said signal conditioning apparatus further providing in each sample time interval said voltage integral signal to each transducer substrate to diaphragm junction, whereby said central electrode to substrate junction nonpressure responsive capacitance is presented with a zero voltage potential thereacross to provide a zero interval response, the ratio of the signal frequencies in successive sample time interval providing the indicia of the applied pressure signal magnitude as a relative factor of the reference pressure signal magnitude.

* * * * *